United States Patent

[11] 3,583,518

| [72] | Inventors | Darwin Carl Bichel;<br>Robert La Verne Malcolm, both of East Moline; Wayne Eldon Slavens, Moline, all of, Ill. |
|---|---|---|
| [21] | Appl. No. | 767,689 |
| [22] | Filed | Oct. 15, 1968 |
| [45] | Patented | June 8, 1971 |
| [73] | Assignee | Deere & Company<br>Moline, Ill. |

[54] OPERATOR'S STATION FOR A SELF-PROPELLED AGRICULTURAL MACHINE
5 Claims, 4 Drawing Figs.

[52] U.S. Cl. ................................................ 180/89,
74/493
[51] Int. Cl. ........................................................ B62d 39/00
[50] Field of Search ........................................... 180/89, 69,
64, 54; 296/65; 74/493

[56] References Cited
UNITED STATES PATENTS
| 2,999,556 | 9/1961 | Horne et al. ................... | 180/89 |
| 3,064,746 | 11/1962 | Williamson ................... | 180/54 |
| 3,198,030 | 8/1965 | Miller et al. ................... | 74/493 |
| 3,261,422 | 7/1966 | Jensen ........................... | 296/65 |
| 3,362,247 | 1/1968 | Watts ............................ | 74/493 |

*Primary Examiner*—Benjamin Hersh
*Assistant Examiner*—Robert R. Song
*Attorneys*—H. Vincent Harsha, Harold M. Knoth, William A. Murray and John M. Nolan

ABSTRACT: A self-propelled combine has a forward transverse engine adjacent the operator's station. The engine drives the various combine functions through several drive systems having inputs mounted on the engine output shaft and covered by an enclosure with a raisable top on which the operator's seat is mounted. The seat is also shiftable rearwardly to permit standup operation of the combine, which is facilitated by an adjustable steering column. The handrail at the front of the operator's station is attached to and moves with the steering column.

PATENTED JUN 8 1971

INVENTORS
D.C. BICHEL, R.L. MALCOLM &
W.E. SLAVENS
BY
John M Nolan
ATTORNEY

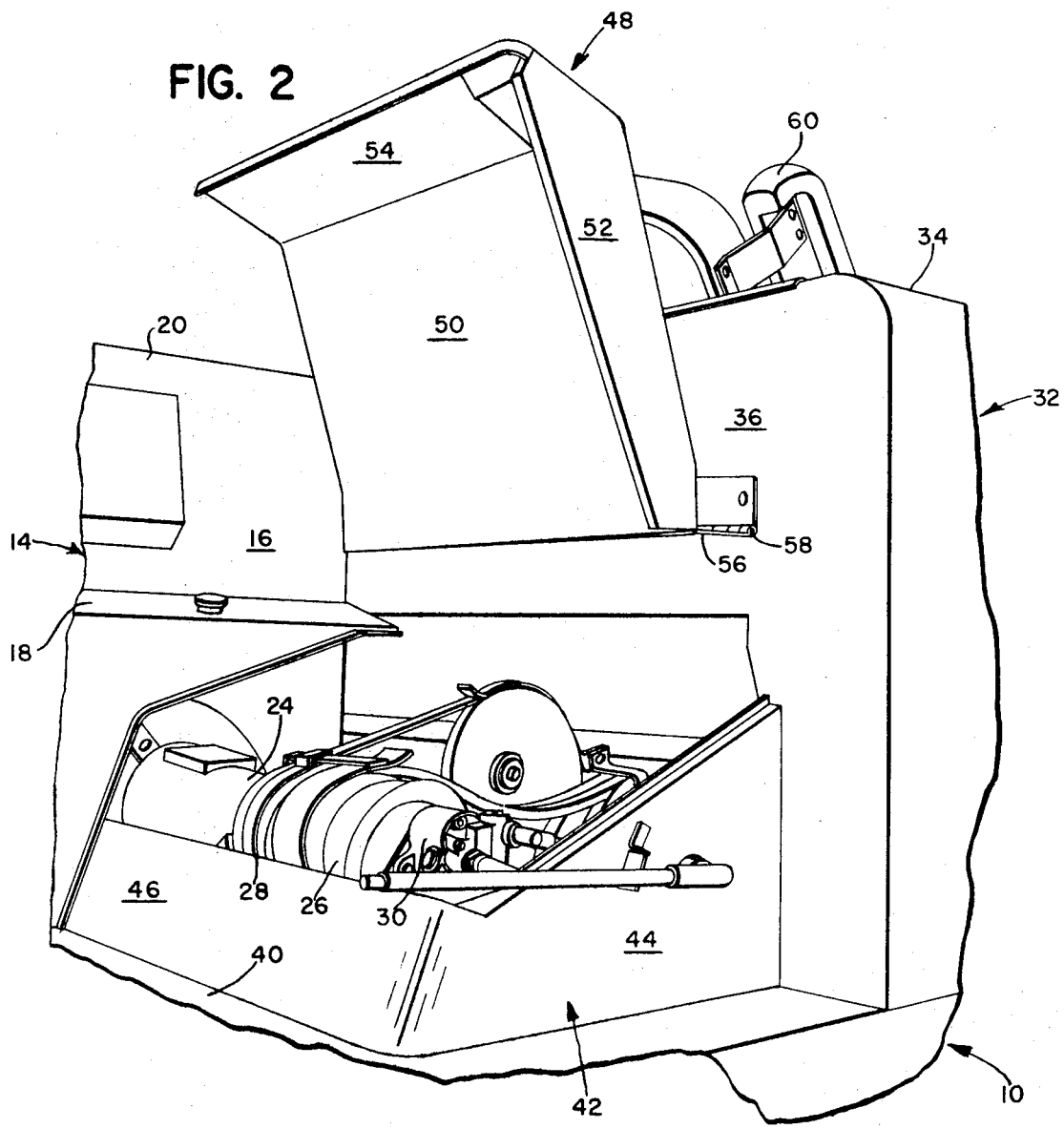
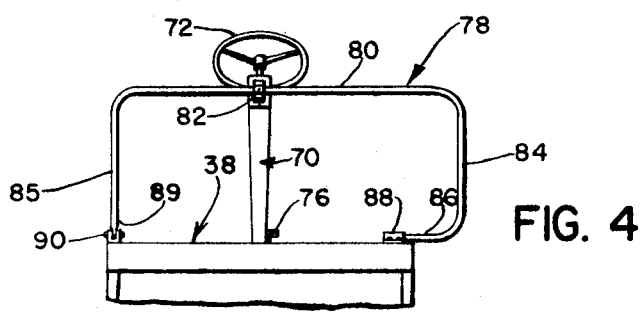

OPERATOR'S STATION FOR A SELF-PROPELLED AGRICULTURAL MACHINE

BACKGROUND OF THE INVENTION

This invention relates to self-propelled agricultural harvesting machines such as combines or the like, and more particularly to a novel arrangement of components at the operator's station on the machine.

It is known to mount the engine at the front of the combine adjacent to and at substantially the same level as the operator's station, immediately in front of the combine grain tank. Such an arrangement of components provides several advantages and creates several problems as well. Generally, combine engines are mounted transversely on the combine so that the engine output shaft is parallel to the drive shafts of most of the combine components, the parallel arrangement of the shafts simplifying the belt drives, which are conventionally used to drive the various combine components. However, when the engine is arranged transversely at the forward end of the combine, with the conventional drives mounted on the engine output shaft and the operator's station disposed laterally adjacent to the engine and drive components, the machine becomes excessively wide.

SUMMARY OF THE INVENTION

According to the present invention, a novel arrangement of components is provided whereby the combine engine is positioned transversely at the front of the combine adjacent to the operator's station without creating an excessively wide machine. More specifically, the engine output shaft and the various drive input elements mounted thereon extend into the operator's station below the operator's seat, the drive input elements being covered with an enclosure on which the seat is mounted.

Also according to the invention, the enclosure on which the seat is mounted is provided with a raisable top to provide access to the various drive elements within the enclosure.

Another feature of the invention resides in the location of the pivot for the raisable enclosure top so that the seat mounted on the enclosure top swings into the open top of the grain tank behind the enclosure, whereby the enclosure top can be fully opened without interference from the seat mounted thereon.

Still another feature of the invention resides in the provision of means for shifting the seat rearwardly to permit standup operation of the combine.

While it is known to provide an adjustable steering wheel on a combine to facilitate standup operation of the machine, according to the present invention, the entire steering column adjusts forwardly and rearwardly about a pivot at the floor of the combine, and, in addition, the conventional handrail which extends across the front of the operator's station, is, according to the present invention, connected to the steering column near its upper end, the lower ends of the handrail being pivotally connected to the floor of the operator's station so that the handrail is adjusted fore and aft with the steering column and maintains its same relationship with the steering wheel.

BRIEF DESCRIPTION OF THE DRAWINGS

FIG. 2 is a perspective view of the seating area of the combine with the seat and the enclosure top swung upwardly to provide access to the drive components within the enclosure.

FIG. 4 is a partial front elevation view of the operator's station on a reduced scale, showing only the steering column and handrail.

DESCRIPTION OF THE PREFERRED EMBODIMENT

Figure 1:
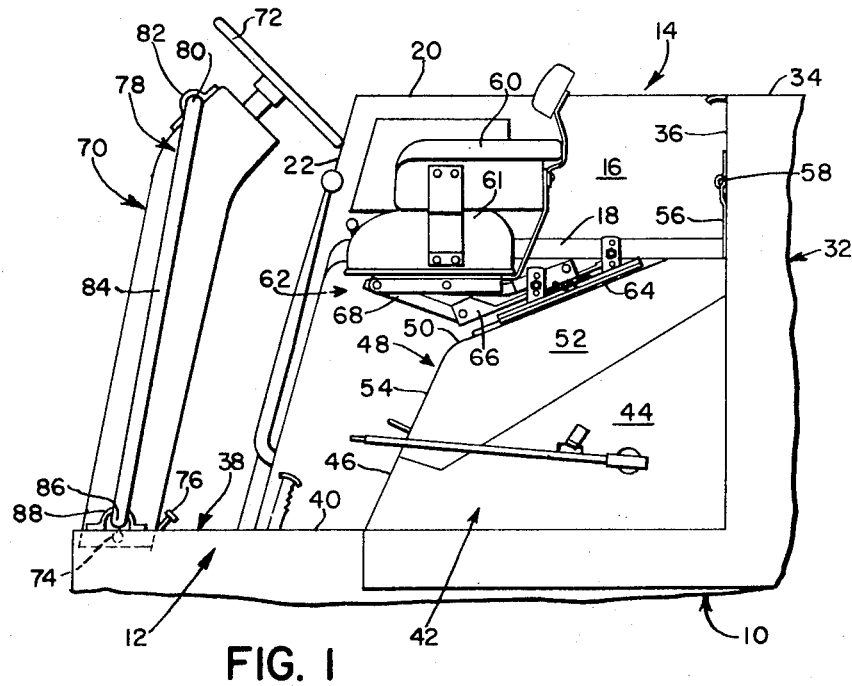
FIG. 1 is a side elevation view of the operator's station embodying the present invention, the steering column and seat being positioned for seated operation of the combine by the operator.

The invention is embodied in a combine having a main separator body, indicated generally by the numeral 10, only the upper forward portion of the body being shown in the drawings. An operator's station, indicated generally by the numeral 12, is located on the upper forward part of the body 10, and laterally adjacent to the operator's station 12 is an engine enclosure 14, the engine enclosure being located at the right side of the combine while the operator's station is on the left side of the combine. It is to be understood that the terms "right" and "left" as well as "forward" and "rearward," etc. are with reference to a person facing the direction of advance of the machine (to the left in FIGS. 1 and 3).

A conventional internal combustion engine (not shown) is located in the engine enclosure 14 with its output shaft extending transversely to the direction of machine travel. The engine enclosure includes a generally upright fore and aft extending left sidewall 16 adjacent to the operator's station 12. A control console 18, which includes many of the combine's instruments and controls, is located adjacent the sidewall 16. The engine enclosure also includes a generally horizontal top wall 20 and a generally upright front wall 22. The engine output shaft extends through a housing 24, which projects through the engine enclosure 3 sidewall 16 toward the operator's station as best seen in FIG. 2, and a pair of drive sheaves 26 and 28 are mounted on and driven by the engine output shaft, the drive sheaves typically serving as the inputs for the propulsion drive and the drive which powers various harvesting components. Also mounted on and driven by the end of the engine output shaft is the main hydraulic pump 30, which supplies fluid pressure to operate the various hydraulic functions on the combine.

An elevated grain tank 32 is mounted on the combine immediately to the rear of the engine enclosure 16 and operator's station 12 and includes an open top 34, which is substantially in the same plane as the top wall 20 of the engine enclosure, and a transverse upright front wall 36, which extends the width of the combine and forms the rear wall of the engine enclosure.

The operator's station 12 includes a horizontal floor 38, which projects forwardly past the front wall of the engine enclosure and has a rearward portion 40 laterally adjacent to the forward portion of the control console 18. The floor is at approximately the same level as the bottom of the engine, so that the axis of the engine output shaft is substantially above the level of the floor. Thus, as best seen in FIG. 3, at least the upper part of the power transmitting components 26, 28 and 30 are above the level of the floor 38.

An enclosure, indicated generally by the numeral 42, covers the engine output shaft and the power-transmitting components 24, 26, 28 mounted thereon. The enclosure 42 includes an upright left side wall 44 extending upwardly from the floor 38 and forwardly from the front wall 36 of the grain tank and a transverse, generally upright front wall 46 extending between the front edge of the sidewall 44 and the control console 18, which forms the right sidewall of the enclosure, while the front wall 36 of the grain tank forms the rear wall of the enclosure. An enclosure top portion or hood 48 covers the top of the enclosure 42 and includes an upwardly and rearwardly inclined top panel 50, a generally upright left side panel 52, which is aligned with and merges with the top of the left sidewall 44, a generally upright front panel 54, which is aligned with and merges with the front wall 46, and an upright rear panel 56 extending upwardly from the rearward edge of the top panel 50 adjacent to the front wall of the grain tank. The entire top portion or hood 48 is raisable away from the remainder of the enclosure 42 about a transverse hinge or pivot 58 connecting the upper end of the rear panel 56 to the front wall 36 of the grain tank.

Figure 3:
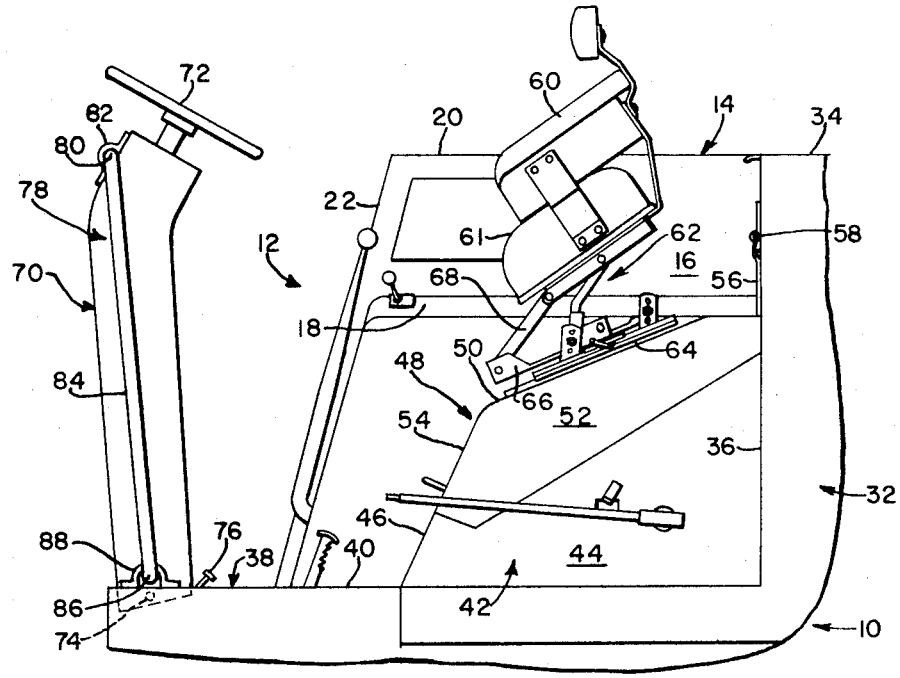
FIG. 3 is a side elevation view similar to FIG. 1 except that the steering column and handrail are shifted forwardly and the seat is shifted rearwardly to permit standup operation of the machine.

A conventional seat 60 having a normally horizontal seating surface 61 is mounted on the enclosure top portion or hood 48 by seat mounting means 62, which includes an upwardly and rearwardly inclined ramp or track 64, mounted on the top panel 50 of the enclosure, a follower member 66, which is adjustable in a generally fore and aft upwardly and rearwardly inclined direction on the ramp 64, and a parallel linkage 68 connecting the seat to the member 66 and permitting the seat to be shifted from a normal operative position with its seating surface horizontal, as shown in FIG. 1, and a folded back position as shown in FIG. 3, wherein the seat is disposed rearwardly of the rearward floor portion 40.

A generally upright steering column structure 70 extends upwardly from the forward end of the floor 38 in general fore and aft alignment with the seat 60 and supports a steering wheel 72 at its upper end. Other combine controls (not shown) are also conventionally mounted on the steering column structure for easy manipulation by the operator while he is also steering the machine. The entire steering column structure 70 is mounted on the combine for fore and aft adjustment about a transverse pivot 74 at the lower end of the steering column structure adjacent to the floor 38. The steering column structure is swingable in an arc about the pivot 74 between a rearward position, as shown in FIG. 1, and a forward position, as shown in FIG. 3, and is selectively locked in the alternate positions shown or in several intermediate positions by a conventional latching mechanism (not shown) at its lower end, the latching mechanism being actuated by the operator by a pedal 76 at the base of the steering column structure.

A handrail structure 78 extends across the front of the operator's station and substantially spans the width of the operator's station to prevent the operator from falling off the front of the operator's station. The handrail includes an upper transverse portion 80, which is pivotally clamped to the forward end of the steering column structure 70 by a U-shaped bracket 82, and a pair of upright leg portions 84 and 85 extending downwardly from the opposite ends of the transverse portion 80. The lower end 86 of the left leg 84 is pivotally connected to the floor by an inverted U-shaped bracket 88, while the lower end 84 of the right leg 85 is pivotally connected to the floor by a pivot structure 90. The pivots 88 and 90 are transversely aligned and substantially in alignment with the axis of the pivot 74, so that the handrail swings in a fore and aft direction with the steering column structure and is maintained in alternate positions corresponding to the alternate positions of the steering column structure.

In operation, when the operator wishes to operate the combine from a seated position, the seat is positioned as shown in FIG. 1. By adjusting the follower member 66 along the ramp 64, the position of the seat in relation to the rest of the controls can be adjusted to suit the individual operator. The steering column structure is also adjusted so that the controls mounted thereon are easily accessible to the seated operator, the steering column structure being adjustable in a fore and aft direction to afford the optimum placement of the steering wheel and controls relative to the seat according to the dictates of the operator. The forward edge of the seating surface 61 generally overlies the rearward portion of the floor 40 which receives the operator's feet.

If the operator desires to operate the combine from a standing position, the seat 62 is shifted upwardly and rearwardly to the position shown in FIG. 3, so that the seat 62 is entirely clear of the rearward portion of the floor on which the operator stands. The steering column structure 70 is also shifted forwardly so that it also is forwardly of the rearward floor portion 40. In addition, when the structure 70 is swung forwardly, the tilt of the steering wheel is decreased to a more advantageous angle for the standing operator. The handrail 78 is close to the operator to provide maximum protection and the fact that the handrail is also shifted forwardly when the steering column structure is shifted forwardly automatically places the handrail in a position wherein it will not interfere with the standing operator, even though it is relatively close to the operator when he is in the seated position. The swinging handrail and steering column structure also facilitate ingress and egress from the operator's station when the combine is being operated from the seated position.

The location of the engine output shaft and the various power-transmitting components 26, 28 and 30 below the seat 60 permits a lesser overall width of the machine than if the operator's station were disposed laterally from the end of the engine output shaft. The enclosure 42 provides the necessary shielding for the power-transmitting components, while the raisable enclosure hood 48 provides service access to the power-transmitting components. As is apparent, the hinge 58 is located above the level of the enclosure so that the seat and its mounting means 62 swing upwardly a sufficient distance to clear the top of the grain tank when the hood 48 is opened, whereby a portion of the seat swings into the open top of the grain tank, permitting the enclosure hood 48 to be fully opened.

We claim:

1. In a self-propelled combine having an elevated operator's station including a steering wheel and a floor with a generally horizontal rear portion below the steering wheel, a power source laterally adjacent to the operator's station and including a transverse output shaft, and a grain tank disposed rearwardly of the operator's station and including an open top and a generally upright front wall, the improvement comprising: a power-transmitting means associated with the output shaft and including an upper portion disposed above the level of the rear floor portion and forwardly of the grain tank front wall; an enclosure substantially covering the upper portion of the power-transmitting means forwardly of the grain tank front wall and including a front wall extending upwardly from and delineating the rearward end of the rear floor portion and a top portion swingably mounted on a transverse horizontal pivot means on an upper portion of the grain tank front wall for swinging about its rearward end between a lowered closed position and a raised open position wherein it exposes the power-transmitting means to provide access thereto from the operator's station; a seat; and means for mounting the seat on the enclosure top portion behind the steering wheel, whereby the seat swings upwardly and rearwardly over the top edge of said grain tank front wall as the top portion swings from its closed to its open position.

2. The invention described in claim 1 wherein the seat-mounting means includes means for shifting the seat between a forward operative position, wherein the front edge of the seat is generally above the rearward end of the rear floor portion and a seated operator is positioned to operate the steering wheel, and a rearward inoperative position wherein the seat is rearwardly of the rear floor portion clear of an operator standing on the rear floor portion.

3. The invention described in claim 1 wherein the seat-mounting means includes means for adjusting the seat in a generally fore and aft, upwardly and rearwardly inclined direction relative to the enclosure.

4. The invention defined in claim 1 wherein at least a portion of the seat moves through the open top of the grain tank when the enclosure top portion is shifted into its open position.

5. The invention defined in claim 4 wherein the pivot means is mounted on the grain tank front wall above the enclosure top portion when the top portion is in its closed position.